S. LESCHZINER.
NUT LOCK AND WASHER.
APPLICATION FILED MAY 27, 1913.
1,156,016.
Patented Oct. 5, 1915.
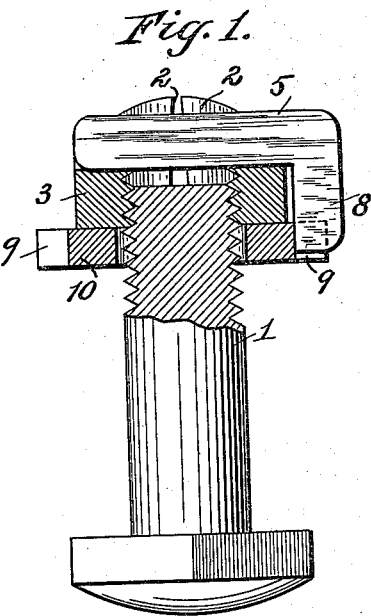
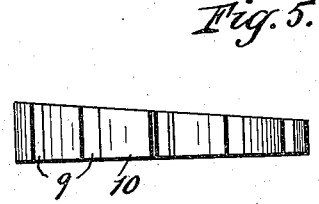
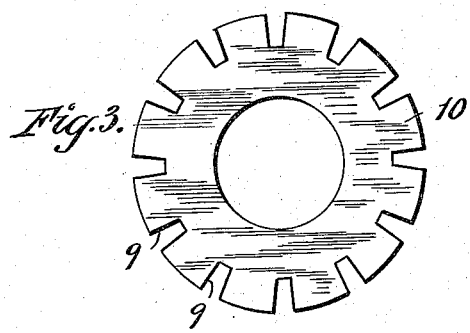
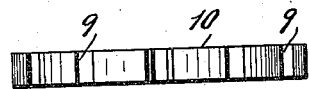
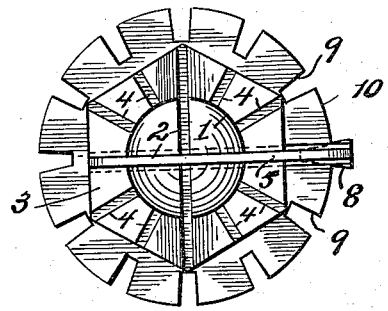
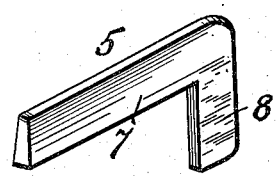
WITNESSES:
Clifford A. Alliston.
Regina A Hanna
INVENTOR
Siegfried Leschziner
BY Fredk C. Fischer
ATTORNEY

UNITED STATES PATENT OFFICE.

SIEGFRIED LESCHZINER, OF NEWARK, NEW JERSEY.

NUT-LOCK AND WASHER.

1,156,016.   Specification of Letters Patent.   Patented Oct. 5, 1915.

Application filed May 27, 1913. Serial No. 770,154.

*To all whom it may concern:*

Be it known that I, SIEGFRIED LESCHZINER, a citizen of the United States, residing in the city of Newark, in the county of Essex and State of New Jersey, have invented certain new and useful Improvements in Nut-Locks and Washers, of which the following is a full, clear, and exact description, such as will enable others skilled in the art to which it pertains to make, construct, and use the same, reference being had to the accompanying drawings, and to numerals of reference marked thereon, forming a part of this specification.

This invention relates to improvements in nut locks and washers, and has for its object a device of this character which will be simple, inexpensive and efficient, adapted for use on rail joints, machinery, and other constructions subject to heavy vibration, and capable of effectually preventing a nut from accidentally unscrewing.

In describing the invention in detail, reference is had to the accompanying drawings forming a part of this specification, and wherein like numerals of reference indicate similar parts throughout the several views of the drawings, and in which—

Figure 1 represents a side elevation, partly in section, of the end of a bolt having my improved nut and washer locked thereon. Fig. 2 represents a plan view of the same. Fig. 3 represents a plan view of my improved lock washer. Fig. 4 represents a side elevation of the same. Fig. 5 represents a side elevation of a modified form of lock washer; and Fig. 6 represents a perspective view of the locking key.

In Fig. 1 of the drawings, I have shown a threaded bolt 1 provided with two diametrically tapered slots 2 upon which is mounted a nut 3 provided with the usual threaded opening, whereby it is inserted on the bolt, and further provided with a plurality of diametrical grooves 4, and extending from the central threaded opening over the outer face of the nut, and the sides of the same, to a point preferably midway between the two faces. After the nut has been screwed home, a key 5 is employed to lock the same, said key consisting of a tapered cross-bar 7 which is adapted to enter one of the slots 2 of the bolt and the registering face grooves 4 in the nut, and the tapered depending lug 8 of the key 5 adapted to enter one of the correspondingly tapered recesses 9 formed in the outer peripheral face of the lock washer 10.

From an inspection of Figs. 3, 4 and 5 of the drawings, it will be noticed that the locking washer 10 is provided with a plurality of tapered recesses formed on its peripheral face, and extending inwardly from said peripheral face, said recesses 9 being of a shape to correspond with the shape of the depending lug 8 of the key 5, so that when the lug 8 of said key is in engagement with one of the recesses 9 of the lock washer 10, the same is prevented from turning. In Fig. 5 of the drawings, I have shown a washer provided with a beveled face, which, because of said bevel, fits snugly the beveled edge of the base of a rail, and thereby permits of greater attrition than the ordinary washer and is prevented from turning.

Changes in the form, proportion and minor details of construction, as defined by the claims, may be resorted to without departing from the spirit or sacrificing any of the advantages of this invention.

I claim:

1. The combination with the bolt having diametrical slots, of a nut formed with a plurality of diametrically-opposite grooves extending from its central opening over one face and in its side, of a locking washer having recesses formed on its peripheral face, and a key fitting accurately the slot in the bolt, the registering face grooves and side grooves of the nut and the recesses in the locking washer.

2. The combination with the bolt having a plurality of diametrical tapered slots, of a nut formed with a plurality of registering tapered grooves extending from its central opening over one face and in its side, of a locking washer provided with a tapered face and having recesses formed in its peripheral face, a tapered key comprising a tapered cross-bar fitting accurately one of the slots in the bolt and the registering face grooves of the nut, and a tapered depending lug adapted to be received in one of the tapered recesses in the outer peripheral face of the locking washer.

This specification signed and witnessed this 26th day of May, 1913.

SIEGFRIED LESCHZINER.

Witnesses:
FRED'K C. FISCHER,
CLIFFORD A. ALLISTON.

Copies of this patent may be obtained for five cents each, by addressing the "Commissioner of Patents, Washington, D. C."